(12) United States Patent
Miura et al.

(10) Patent No.: US 6,918,504 B2
(45) Date of Patent: Jul. 19, 2005

(54) FUEL SUPPLY APPARATUS

(75) Inventors: Natsushi Miura, Aichi-ken (JP); Zenichi Yasuda, Aichi-ken (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 66 days.

(21) Appl. No.: 10/448,278

(22) Filed: May 30, 2003

(65) Prior Publication Data

US 2004/0021315 A1 Feb. 5, 2004

(30) Foreign Application Priority Data

Jun. 4, 2002 (JP) ........................................ 2002-162803

(51) Int. Cl.⁷ ................................................. B65B 1/04
(52) U.S. Cl. ..................................... 220/86.2; 137/351
(58) Field of Search ............................... 220/86.2, 86.3, 220/86.4, 562; 296/97.22; 137/587, 351

(56) References Cited

U.S. PATENT DOCUMENTS 6,033,006 A * 3/2000 Bovellan et al. ......... 296/97.22
6,305,408 B1 * 10/2001 Goto et al. .................. 137/351
6,435,233 B1    8/2002 Miura et al.

FOREIGN PATENT DOCUMENTS

| JP | A-H11-115510 |   | 4/1999 |
| JP | 11-165545    | * | 6/1999 |

* cited by examiner

Primary Examiner—Joseph C. Merek
(74) Attorney, Agent, or Firm—Posz Law Group, PLC

(57) ABSTRACT

A fuel supply apparatus includes an inlet box, and a filler neck. The inlet box is dented in a vehicle panel, and has a bottom wall, a neck-penetrating opening pierced through the bottom wall, a box-side axial engagement portion and a box-side radial engagement portion. The filler neck is disposed to penetrate through the neck-penetrating opening into the inlet box, and has an outer peripheral surface provided with a flange. The flange has a flange-side axial engagement portion engaging with the box-side axial engagement portion to regulate axial movements of the filler neck, and a flange-side radial engagement portion engaging with the box-side radial engagement portion to regulate radial movements of the filler neck. The fuel supply apparatus can be assembled with ease, and can be manufactured at reduced cost.

15 Claims, 17 Drawing Sheets

FUEL SUPPLY APPARATUS

BACKGROUND OF THE INVENTION

1. Field of the Invention

The present invention relates to a fuel supply apparatus which introduces supplied fuels into fuel tanks.

2. Description of the Related Art

FIG. 17 illustrates an axial cross-sectional view of a conventional fuel supply apparatus 100. As illustrated in the drawing, the fuel supply apparatus 100 is provided with an inlet box 101 and a filler neck 102. The inlet box 101 is metallic, and is formed as a box shape which opens outward. Note that the inlet box 101 is dented in a vehicle panel (not shown). The inlet box 101 is welded to the vehicle panel. In a bottom wall 103 of the inlet box 101, a neck-penetrating opening 104 and bolt-penetrating holes 105 are pierced.

The filler neck 102 is plastic, and is formed as a cylinder shape. A top end 106 of the filler neck 102 is protruded through the neck-penetrating opening 104 into the inlet box 101. The top end 106 is covered with a metallic fitting 107. At the free end of the top end 106, a fuel supply opening 108 is disposed. On an outer peripheral surface of the filler neck 102, a flange 109 is formed. In a bottom surface of the flange 109, metallic nuts 110 are disposed by insert molding. Moreover, the flange 109 is provided with communication holes 111 which are pierced to communicate with the nuts 110. The communication holes 111 are disposed to face the bolt-penetrating holes 105 of the inlet box 101. Note that the filler neck 102 is connected with an inlet pipe (not shown), which communicates with a fuel tank (not shown), at the lower end.

The filler neck 102 is assembled with the inlet box 101 in the following manner. First, the bolt-penetrating holes 105 are positioned with respect to the communication holes 111. Then, the bolts 112 are penetrated both of the holes. Finally, the bolts 112 are screwed into the nuts 110.

However, in order to screw the bolts 112 into the nuts 110, it is necessary to rotate the bolts 112 with a predetermined torque by a predetermined number of turns. Note that the operation is not so simple as stated. In addition, the filler neck 102 is assembled with the inlet box 101 from the inner side of the vehicle panel. Accordingly, in screwing the bolts 112 into the nuts 110, only a limited working space is available. Combined with the limited working space, the operation is furthermore complicated when the bolts 112 are screwed into the nuts 110. Moreover, it is needed to dispose the nuts 110 on the bottom surface of the flange 109 by insert molding. To carry out insert molding results in prolonging the molding cycle. Thus, the machine rate goes up. Therefore, the manufacturing cost of the conventional fuel supply apparatus 100 has gone up eventually.

Japanese Unexamined Patent Publication (KOKAI) No. 11-115,510 discloses a filler neck having a flange. The flange is formed as a diamond shape, and is provided with a nut and a letter "V"-shaped groove which are disposed at diagonal positions to each other in the diamond shape. According to the publication, the filler neck is assembled with an inlet box in the following manner. A neck-side opening is held at a point in the periphery by the letter "V"-shaped groove which is disposed at one of the diagonal ends of the flange. Then, a bolt is screwed into a nut which is disposed at the other one of the diagonal ends of the flange.

Thus, even in the filler neck set forth in the publication, an operation is required to screw the bolt into the nut when assembling the filler neck with the inlet box. Moreover, it is also necessary to dispose the nut by insert molding prior to the assembling operation.

When the filler neck is assembled with the inlet box by the screwed bolt-and-nut fastening mechanism, it is possible to regulate the radial movements of the filler neck with respect to the inlet box because the bolt is penetrated the nut. Moreover, it is possible to regulate the axial movements of the filler neck with respect to the inlet box because the screwed crest, formed on the outer peripheral surface of the bolt, engages with the screwed root, formed on the inner peripheral surface of the nut. Thus, it is possible to simultaneously regulate the radial and axial movements of the filler neck by the screwed bolt-and-nut fastening mechanism. On the other hand, however, it is difficult to avoid the above-described operational complication and increasing manufacturing cost, as far as the filler neck is assembled with the inlet box by the screwed bolt-and-nut fastening mechanism.

SUMMARY OF THE INVENTION

The present invention has been developed and completed in view of the aforementioned problems. It is therefore an object of the present invention to provide a fuel supply apparatus which can be assembled with ease, and which can be manufactured at reduced cost.

A fuel supply apparatus according to the present invention can achieve the object, and comprises: an inlet box dented in a vehicle panel, and having a bottom wall, a neck-penetrating opening pierced through the bottom wall, a box-side axial engagement portion and a box-side radial engagement portion; and a filler neck disposed to penetrate through the neck-penetrating opening into the inlet box, and having an outer peripheral surface provided with a flange, the flange having a flange-side axial engagement portion engaging with the box-side axial engagement portion to regulate axial movements of the filler neck and a flange-side radial engagement portion engaging with the box-side radial engagement portion to regulate radial movements of the filler neck.

In the present fueling apparatus, the filler neck is assembled with the inlet box by an engagement mechanism instead of the screwed bolt-and-nut fastening mechanism which has been carried out conventionally. When carrying out the assembly, it is necessary to regulate the axial and radial movements of the filler neck. In the present fuel supply apparatus, it is possible to regulate the axial movements of the filler neck by engaging the box-side axial engagement portion with the flange-side axial engagement portion. Moreover, it is possible to regulate the radial movements of the filler neck by engaging the box-side radial engagement portion with the flange-side radial engagement portion.

In accordance with the present fuel supply apparatus, it is possible to assemble the filler neck with the inlet box by carrying out the engagements alone. Accordingly, it is easy to carry out the assembly operation. Moreover, in accordance with the present fuel supply apparatus, it is possible to make bolts and nuts obsolete. Consequently, it is not needed to dispose nuts on the flange by insert molding. Therefore, it is possible to manufacture the present fuel supply apparatus at reduced cost.

The flange-side axial engagement portion can preferably be disposed at a periphery of the flange over a distance of 1/3 or more of the peripheral length of the flange.

Specifically, in the preferred arrangement, the engagement between the flange-side axial engagement portion and the box-side axial engagement portion is secured over a distance of ⅓ or more of the peripheral length of the flange. The flange-side axial engagement portion is disposed over a distance of ⅓ or more of the peripheral length of the flange because of the following reasons. When it is disposed over a distance of less than ⅓ of the peripheral length of the flange, there might arise a fear that the engagement between the flange-side axial engagement portion and the box-side axial engagement makes a fulcrum about which the filler neck swings.

The flange-side axial engagement portion can preferably be an engagement groove dented radially at a periphery of the flange; and the box-side axial engagement portion can preferably be an engagement tab fitted into the engagement groove and held therein.

Specifically, in the preferred arrangement, the axial movements of the filler neck are regulated by holding the engagement tab with the engagement groove from both of the axial sides. In accordance with the preferred arrangement, it is possible to regulate the axial movements of the filler neck by a relatively simple mechanism. Accordingly, the assembly operation is made much easier. In addition, it is possible to further reduce the manufacturing cost.

A disengagement groove can preferably be formed in a groove wall of the engagement groove, the disengagement groove disengaging the engagement between the engagement groove and the engagement tab when a predetermined stress is applied to said filler neck.

The filler neck is engaged with the inlet box. When the engaging force is large excessively, there might arise a fear that, if large shocks are applied to vehicles, an inlet pipe or a fuel tank is suspended from the engaged filler neck. Thus, when excessive stresses are applied to the inlet pipe or fuel tank, a certain disadvantage might arise.

In view of the drawback, the groove wall of the engagement groove is provided with the disengagement groove in the preferred arrangement. When a predetermined stress is applied to the filler neck, the disengagement groove disengages the engagement between the engagement groove and the engagement tab. Accordingly, when shocks which are a predetermined stress or more are applied to the filler neck, the filler neck comes off from the inlet box. Therefore, in accordance with the preferred arrangement, there scarcely arises a fear that the inlet pipe and fuel tank suffer from problems.

The flange-side radial engagement portion can preferably be a flange-side engagement hole penetrating top and bottom surfaces of the flange; the box-side radial engagement portion can preferably be a box-side engagement hole penetrating top and bottom surfaces of the bottom wall of said inlet box; and the fuel supply apparatus can preferably further comprise a clip penetrating the flange-side engagement hole and the box-side engagement hole.

Specifically, in the preferred arrangement, the radial movements of the filler neck are regulated by fitting the clip into the flange-side engagement hole and the box-side engagement hole which are positioned with respect to each other. In accordance with the preferred arrangement, unlike the screwed bolt-and-nut fastening mechanism, it is unnecessary to helically rotate the clip. Accordingly, it is very easy to assemble the filler neck with the inlet box.

The flange-side radial engagement portion can preferably be an engagement claw disposed to protrude from a top surface of the flange; and the box-side radial engagement portion can preferably be an engagement dent dented in a bottom surface of the bottom wall, the bottom surface facing the top surface of the flange, and engaging with the engagement claw.

Specifically, in the preferred arrangement, the radial movements of the filler neck are regulated by engaging the engagement claw with the engagement dent. In accordance with the preferred arrangement, it is not required to separately dispose other component parts such as clips. Accordingly, it is possible to make the operation for assembling the filler neck with the inlet box much easier.

The flange-side axial engagement portion and the flange-side radial engagement portion can preferably be disposed at diagonal positions to each other.

When the flange-side axial engagement portion and flange-side radial engagement portion are disposed in a deviated manner, the engagement between the flange-side axial engagement portion and box-side axial engagement portion as well as the engagement between the flange-side radial engagement portion and box-side radial engagement portion are localized in the peripheral direction of the flange and neck-penetrating opening. Accordingly, there might arise a fear that the engaging forces are exerted in a deviated manner. Therefore, when a stress is applied in a specific direction, there might arise a fear that the filler neck is likely to come off from the inlet box.

Considering the fear, it is preferable to dispose the flange-side axial engagement portion and flange-side radial engagement portion in a dispersed manner in the peripheral direction of the flange and neck-penetrating opening. In accordance with the preferred arrangement, the flange-side axial engagement portion and flange-side radial engagement portion are disposed at an interval of 180 degrees in the peripheral direction of the flange and neck-penetrating opening. Accordingly, there is no fear that the engaging forces are exerted in a deviated manner. Therefore, when stresses are applied in every direction, the filler neck is less likely to come off from the inlet box.

Note that the flange-side axial engagement portion or flange-side radial engagement portion may be extended in the peripheral direction of the flange and neck-penetrating opening. If such is the case, it is likewise involved in the preferred arrangement when the peripheral middle positions of the flange-side axial engagement portion and flange-side radial engagement portion are disposed at diagonal positions to each other.

Thus, in accordance with the present invention, it is possible to provide a fuel supply apparatus which can be assembled with ease, and which can be manufactured at reduced cost.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLES

Hereinafter, fuel supply apparatuses according to examples of the present invention will be described in detail.

Example No. 1

Figure 1:
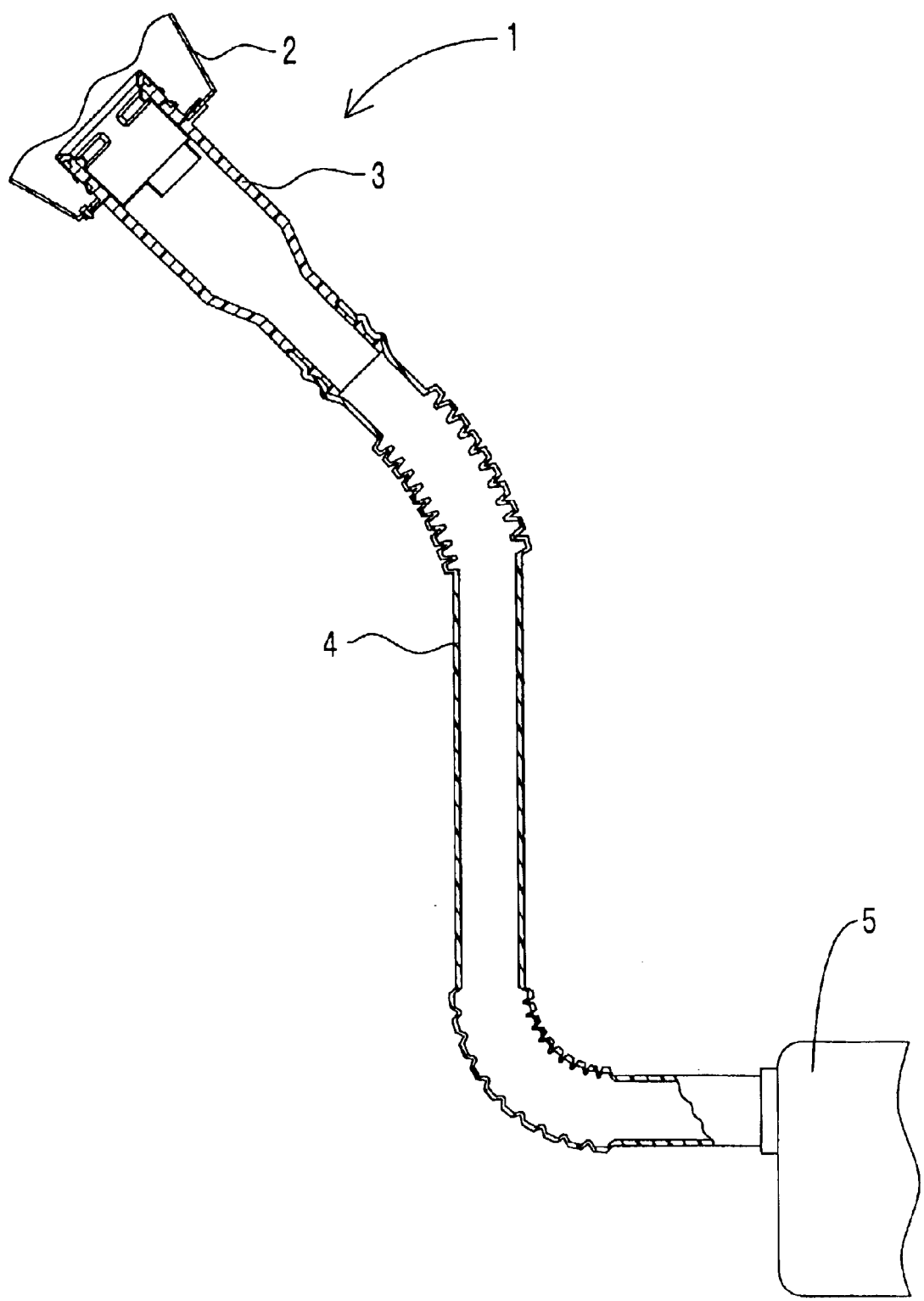
FIG. 1 is a drawing for illustrating how a fuel supply apparatus according Example No. 1 of the present invention is disposed.

First, the arrangement of a fuel supply apparatus 1 according to Example No. 1 will be described. FIG. 1 illustrates how the fuel supply apparatus 1 according Example No. 1 is disposed. As shown in the drawing, the fuel supply apparatus 1 comprises an inlet box 2, and a filler neck 3. The lower end of the filler neck 3 is press-fitted into the upper-end opening of an inlet tube 4. The inlet tube 4 is made from polyethylene resin (PE), and is formed as a cylinder shape having bellows. The lower-end opening of the inlet tube 4 is opened into a fuel tank 5 made from PE.

Figure 2:
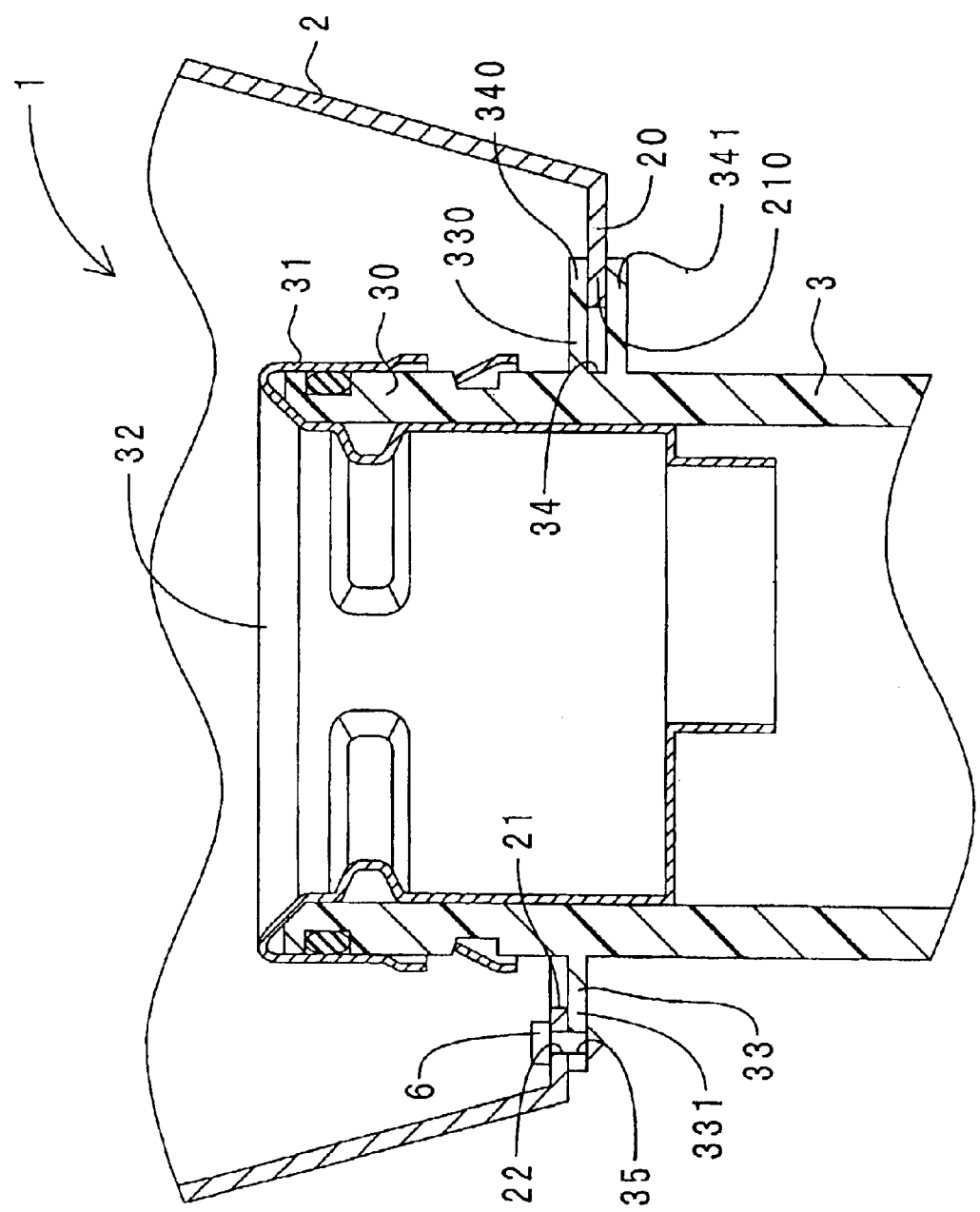
FIG. 2 is an axial cross-sectional view of the fuel supply apparatus according to Example No. 1.
Figure 3:
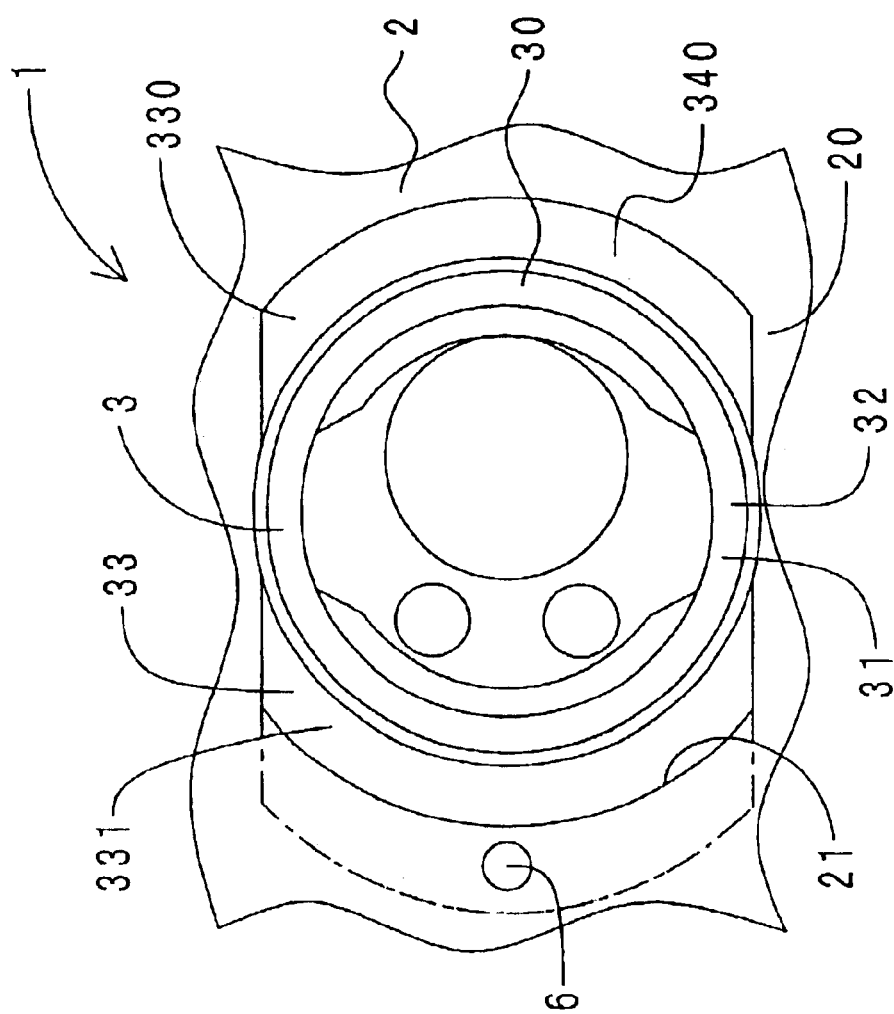
FIG. 3 is a top view of the fuel supply apparatus according to Example No. 1.

FIG. 2 illustrates an axial cross-sectional view of the fuel supply apparatus 1 according to Example No. 1. FIG. 3 illustrates a top view of the fuel supply apparatus 1 according to Example No. 1. The inlet box 2 is made of metal, and is formed as a box shape opening outward. The inlet box 2 is dented in a vehicle panel (not show). The inlet box 2 is welded to the vehicle panel. At the substantial middle of a bottom wall 20 of the inlet box 2, a neck-penetrating opening 21 is pierced. Moreover, at the periphery of the bottom wall 20, a box-side engagement hole 22 is pierced.

The filler neck 3 is made from PE, and is formed as a cylinder shape. An upper end 30 of the filler neck 3 is protruded into the inlet box 2 through the neck-penetrating opening 21. The upper end 30 is covered with a fitting 31 made of metal. The leading end of the upper end 30 demarcates a fuel supply opening 32. The outer peripheral surface of the filler neck 3 is provided with a flange 33.

The flange 33 comprises a first arc 330, and a second arc 331. The first arc 330 is formed as a letter "U" shape. At the periphery of the first arc 330, an engagement groove 34 is dented. Note that the engagement groove 34 is disposed over a distance of ⅓ of the peripheral length of the flange 33. Above and below the engagement groove 34, groove walls 340, 341 comprising an arc-shaped plate are disposed, respectively. A periphery 210 of the neck-penetrating opening 21 is fitted into the engagement groove 34, and is held between the groove walls 340, 341. Note that the periphery 210 is included in the engagement tab according to the present invention.

The second arc 331 is disposed at a diagonal position with respect to the first arc 330. In the peripheral middle of the second arc 331, a flange-side engagement hole 35 is pierced. The flange-side engagement hole 35 and the box-side engagement hole 22 are disposed in series in the axial direction of the fuel supply apparatus 1. Into the flange-side engagement hole 35 and box-side engagement hole 22, a nail-shaped clip 6 is press-fitted. Note that the clip 6 is made from resin, and has a diametrically-enlarged leading end.

Figure 4:
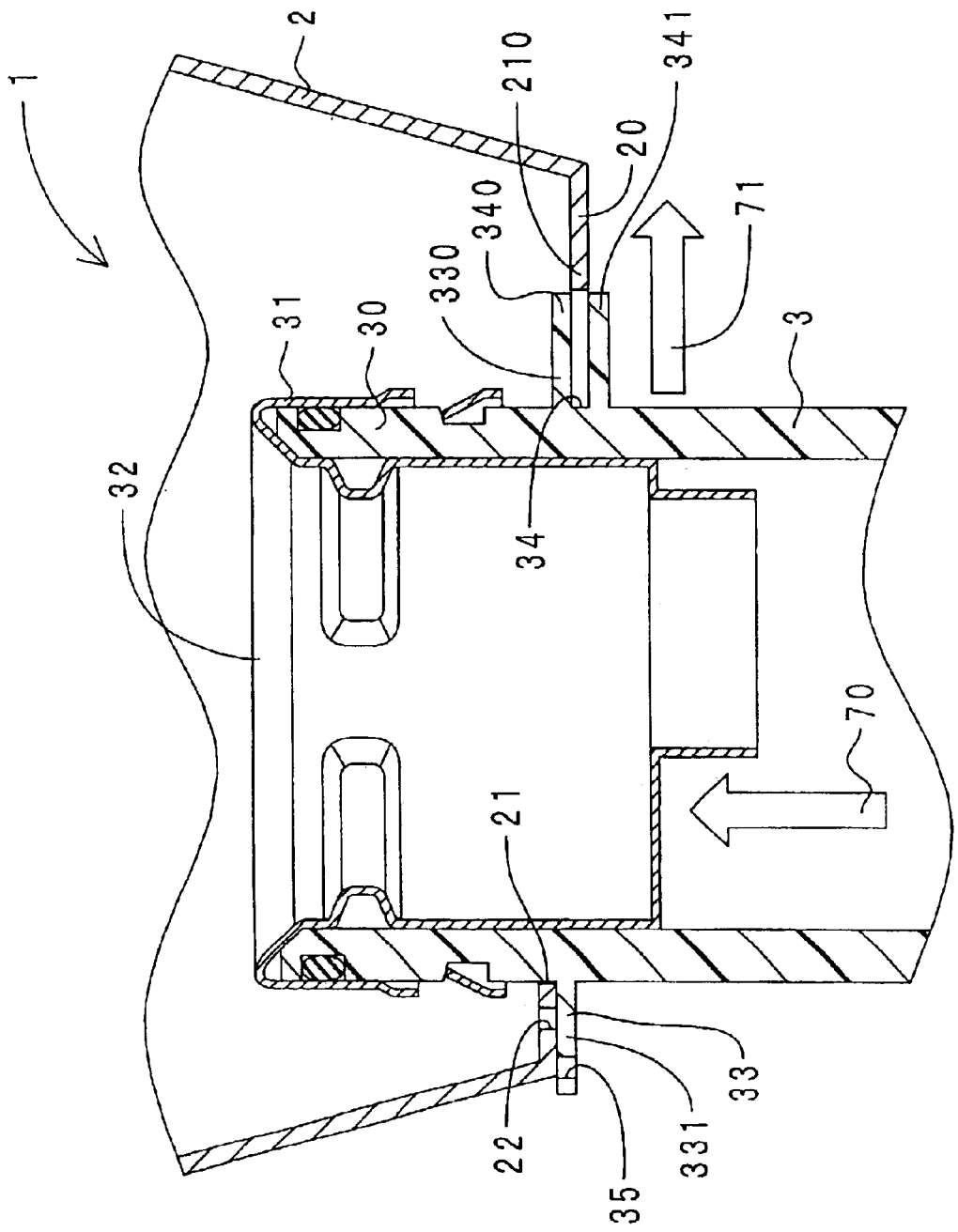
FIG. 4 is an axial cross-sectional view of the fuel supply apparatus according to Example No. 1 when it is assembled.
Figure 5:
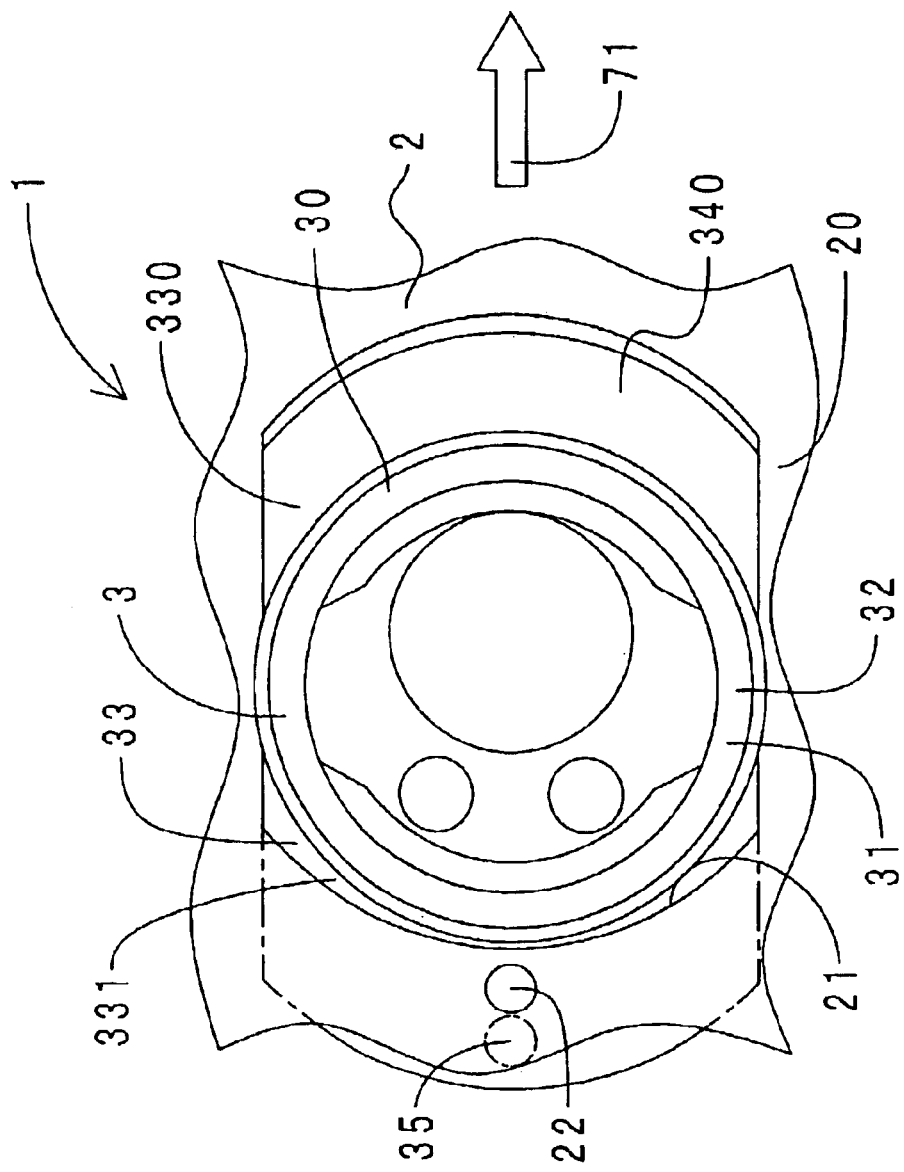
FIG. 5 is a top view of the fuel supply apparatus according to Example No. 1 when it is assembled.

How to assemble the filler neck 3 with respect to the inlet box 2 will be hereinafter described. FIG. 4 illustrates an axial cross-sectional view of the fuel supply apparatus 1 according to Example No. 1 when it is assembled. FIG. 5 illustrates a top view of the fuel supply apparatus 1 according to Example No. 1 when it is assembled. First, the filler neck 3 is approached the inlet box 2 from the inside of the vehicle panel as designated with the arrow 70. Then, the upper end 30 is protruded into the inlet box 2 through the neck-penetrating opening 21. Subsequently, the second arc 331 of the flange 33 is contacted with the bottom wall 20 of the inlet box 2. Note that the bottom wall 20 is formed as a step descending from the left-hand side to the right-hand side in FIG. 4, or the left-hand and right-hand sides of the bottom wall 20 are disposed in a vertically staggered manner so that the right-hand side is disposed below the left-hand side via the filler neck 3 in the drawing. Accordingly, when the second arc 331 is contacted with the bottom wall 20, the groove wall 340 is disposed above the periphery 210 of the inlet box 2. While keeping the temporarily assembled state, the filler neck 3 is slid as designated with the arrow 71. When the filler neck 3 is slid, the periphery 210 of the inlet box 2 is fitted relatively into the engagement groove 34 between the groove wall 340 and groove wall 341. The filler neck 3 is slid until the box-side engagement hole 22 and flange-side engagement hole 35 are disposed in series in the axial direction of the fuel supply apparatus 1. Finally, the clip 6 (not shown in FIGS. 4 and 6) is press-fitted into the box-side engagement hole 22 and flange-side engagement hole 35.

The operations of the fuel supply apparatus 1 according to Example No. 1 will be hereinafter described. In the fuel supply apparatus 1 according to Example No. 1, the axial movements of the filler neck 3 are regulated by engaging the periphery 210 of the inlet box 2 with the engagement groove 34 of the filler neck 3. Moreover, the radial movements of the filler neck 3 are regulated by penetrating the clip 6 through the box-side engagement hole 22 and flange-side engagement hole 35. Thus, in the fuel supply apparatus 1 according to Example No. 1, the filler neck 3 can be assembled with the inlet box 2 by simply engaging the periphery 210 with the engagement groove 34. Accordingly, the assembly operation is thus simplified. Moreover, in the fuel supply apparatus 1 according to Example No. 1, no bolts and nuts are used. Consequently, it is not required at all to dispose nuts on the flange 33 by insert molding. Therefore, it is possible to manufacture the fuel supply apparatus 1 according to Example No. 1 at reduced cost.

Further, in the fuel supply apparatus 1 according to Example No. 1, the engagement groove 34 is disposed at the periphery of the flange 33 over a distance of ⅓ of the peripheral length of the flange 33. Accordingly, the fuel supply apparatus 1 according to Example No. 1 is less likely to suffer from a fear that the engagement between the engagement groove 34 and the peripheral end 210 makes a fulcrum about which the filler neck 3 swings.

Furthermore, in the fuel supply apparatus 1 according to Example No. 1, the engagement groove 34 is disposed so as to serve as the flange-side axial engagement portion. Moreover, the periphery 210 is disposed so as to serve as the box-side axial engagement portion. In view of this arrangement, it is easy to assemble the fuel supply apparatus 1 according to Example No. 1. As a result, the fuel supply apparatus 1 according to Example No. 1 can be manufactured at reduced cost.

Moreover, in the fuel supply apparatus 1 according to Example No. 1, the filler neck 3 is fastened to the inlet box 2 when the clip 6 is fitted into the flange-side engagement hole 35 and box-side engagement hole 22 which are positioned to each other. In other words, it is possible to fasten the filler neck 3 to the inlet box 2 by snap action. In view of this arrangement, the fuel supply apparatus 1 according to Example No. 1 can be assembled with ease.

In addition, in the fuel supply apparatus 1 according to Example No. 1, the peripheral middle of the engagement groove 34 and the flange-side engagement hole 35 are separated at an interval of 180 degrees in the peripheral direction. Accordingly, the filler neck 3 is less likely to come off from the inlet box 2 when it is subjected to stresses from every direction.

Example No. 2

The difference between Example No. 2 and Example No. 1 is that an engagement claw and an engagement dent are disposed to regulate the radial movements of the filler neck. Therefore, only the distinctive arrangements will be hereinafter described.

Figure 6:
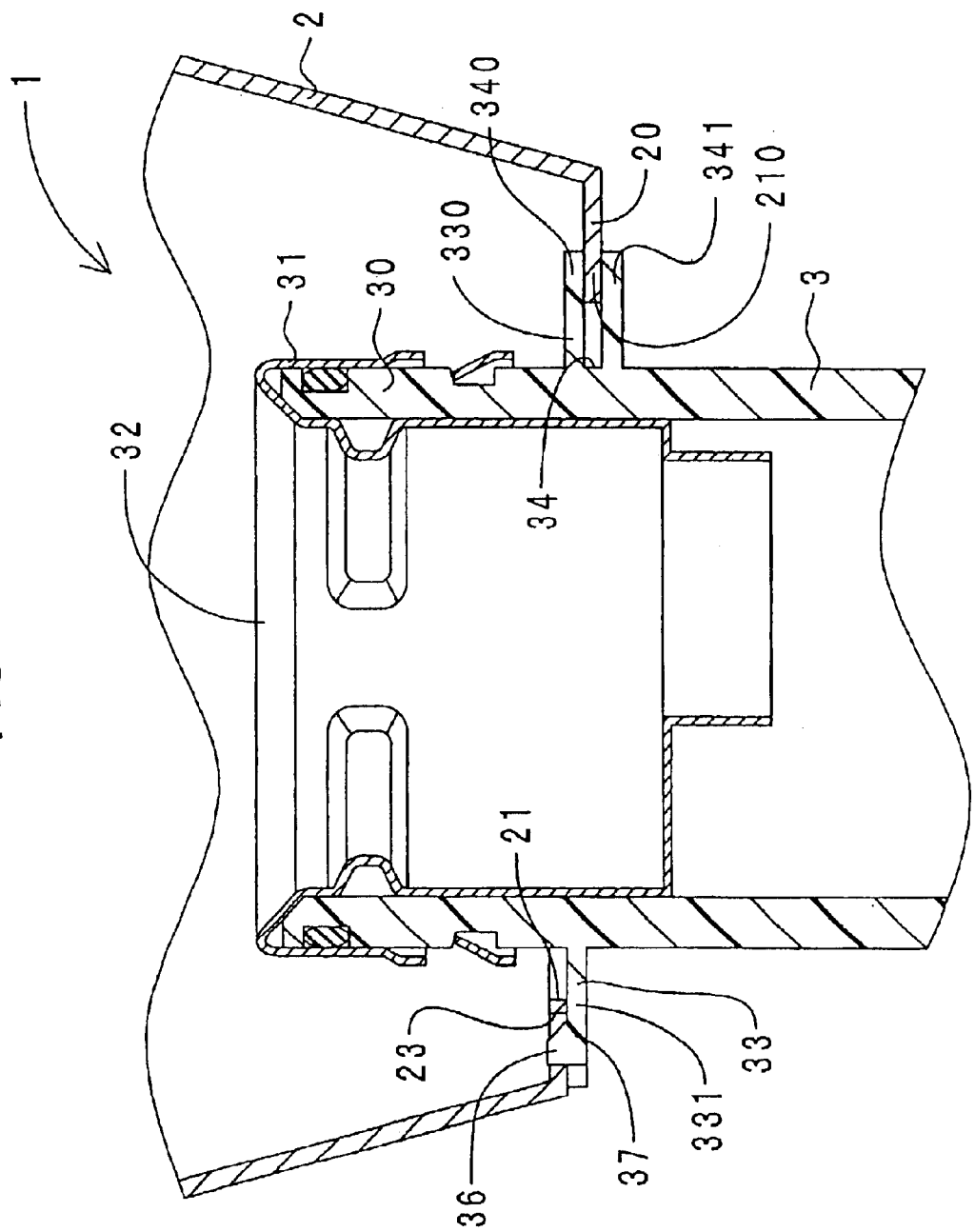
FIG. 6 is an axial cross-sectional view of a fuel supply apparatus according to Example No. 2 of the present invention.
Figure 7:
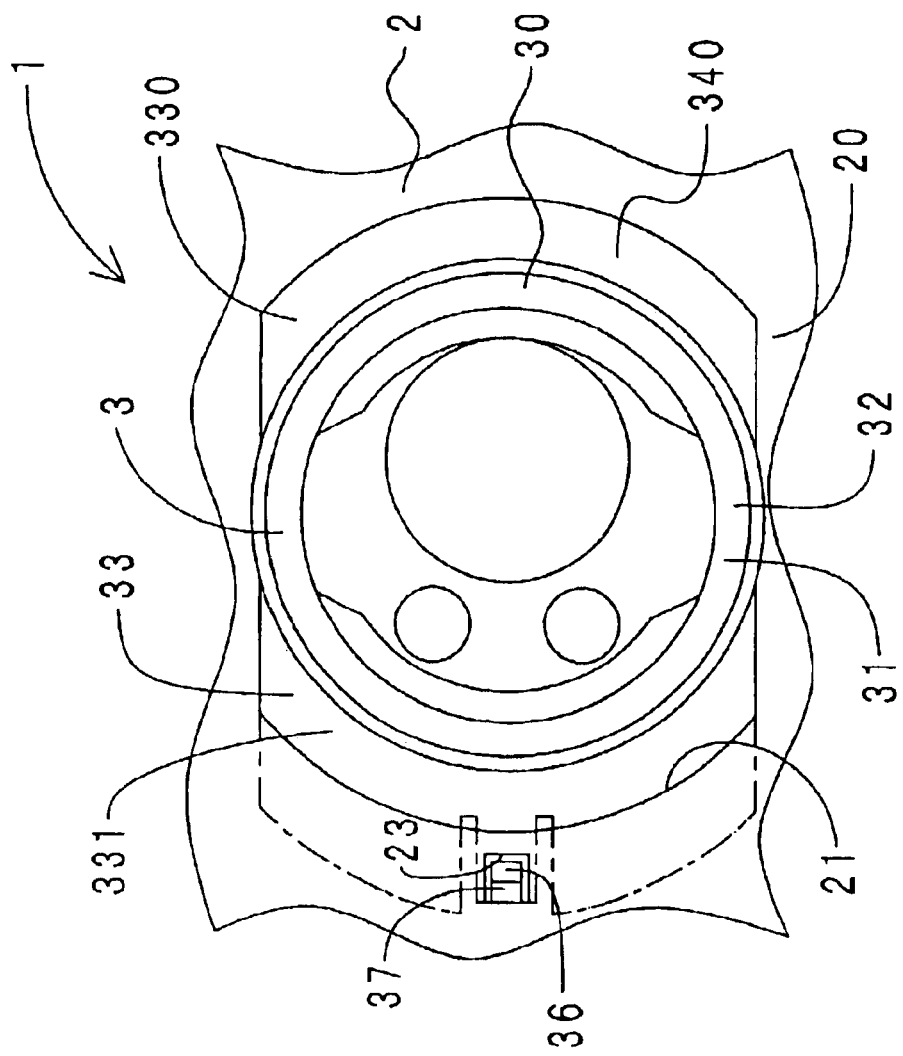
FIG. 7 is a top view of the fuel supply apparatus according to Example No. 2.

FIG. 6 illustrates an axial cross-sectional view of a fuel supply apparatus 1 according to Example No. 2 of the present invention. Note that component parts like those in FIG. 2 are designated with identical numerals. FIG. 7 illustrates a top view of the fuel supply apparatus 1 according to Example No. 2. Similarly, note that component parts like those in FIG. 3 are designated with identical numerals. As shown in the drawings, a projector tab 37 is formed at the substantially middle in the peripheral direction of the second arc 331. On a surface of the projector tab 37, an engagement claw 36 is formed whose cross-section is formed as a trapezoid shape. Moreover, an engagement dent 23 is pierced from the bottom surface to top surface of the bottom wall 20. The engagement claw 36 is fitted into the engagement dent 23.

Figure 8:
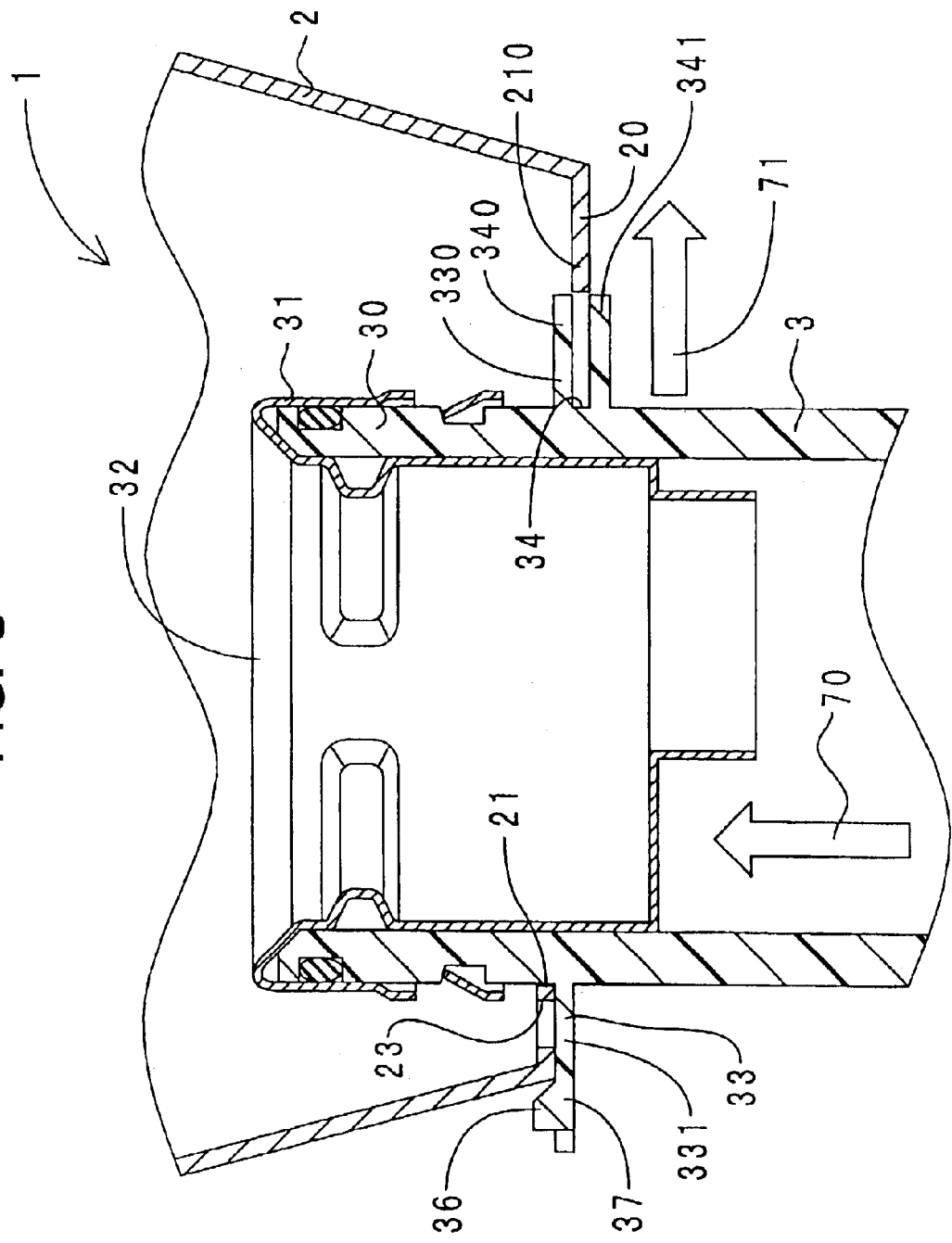
FIG. 8 is an axial cross-sectional view of the fuel supply apparatus according to Example No. 2 when it is assembled.
Figure 9:
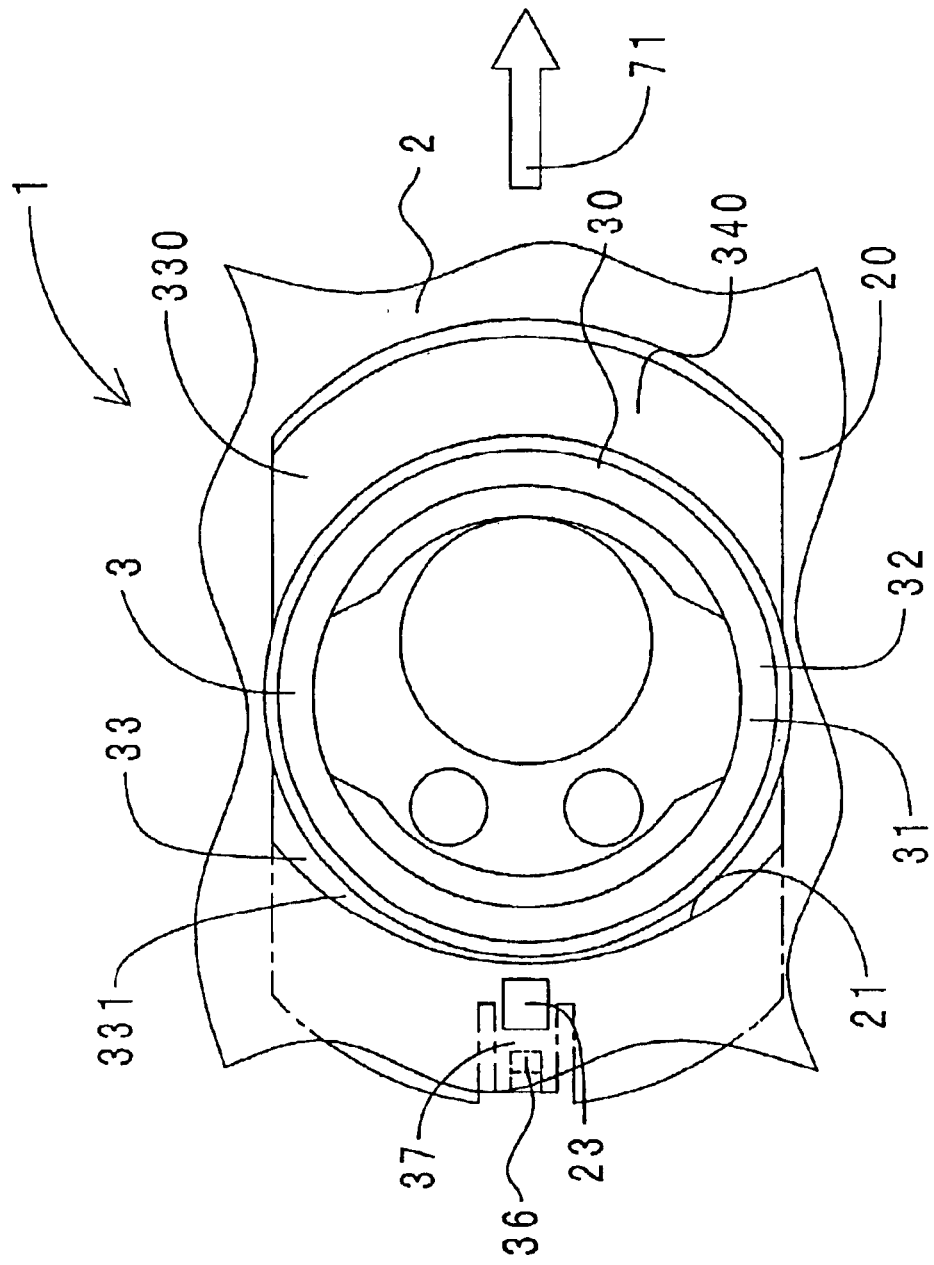
FIG. 9 is a top view of the fuel supply apparatus according to Example No. 2 when it is assembled.

FIG. 8 illustrates an axial cross-sectional view of the fuel supply apparatus 1 according to Example No. 2 when it is assembled. Note that component parts like those in FIG. 4 are designated with identical numerals. FIG. 9 illustrates a top view of the fuel supply apparatus 1 according to Example No. 2 when it is assembled. Similarly, note that component parts like those in FIG. 5 are designated with identical numerals. In the assembly operation, the filler neck 3 is first approached the inlet box 2 from the inside of the vehicle panel as designated with the arrow 70. Then, the upper end 30 is protruded into the inlet box 2 through the neck-penetrating opening 21. Subsequently, the second arc 331 of the flange 33 is contacted with the bottom wall 20 of the inlet box 2. Note that the bottom wall 20 is formed as a step descending from the left-hand side to the right-hand side in FIG. 8. Accordingly, when the second arc 331 is contacted with the bottom wall 20, the groove wall 340 is disposed above the periphery 210 of the inlet box 2. While keeping the temporarily assembled state, the filler neck 3 is slid as designated with the arrow 71. When the filler neck 3 is slid, the peripheral end 210 of the inlet box 2 is fitted relatively into the engagement groove 34 between the groove wall 340 and groove wall 341. Moreover, when the filler neck 3 is slid, the projector tab 37 is flexed downward so that the engagement claw 36 is slid on the bottom surface of the bottom wall 20. When the engagement claw 36 passes over the engagement dent 23, the engagement claw 36 springs up into the engagement dent 23 by the restoring force of the projector tab 37.

In the fuel supply apparatus 1 according to Example No. 2, it is not required to separately dispose a component part such as a clip. Accordingly, the filler neck 3 can be assembled with the inlet box 2 much easier.

Example No. 3

The difference between Example No. 3 and Example No. 2 is that the bottom wall 20 of the inlet box 2 is formed as a flat shape. Therefore, only the distinctive arrangement will be hereinafter described.

Figure 10:
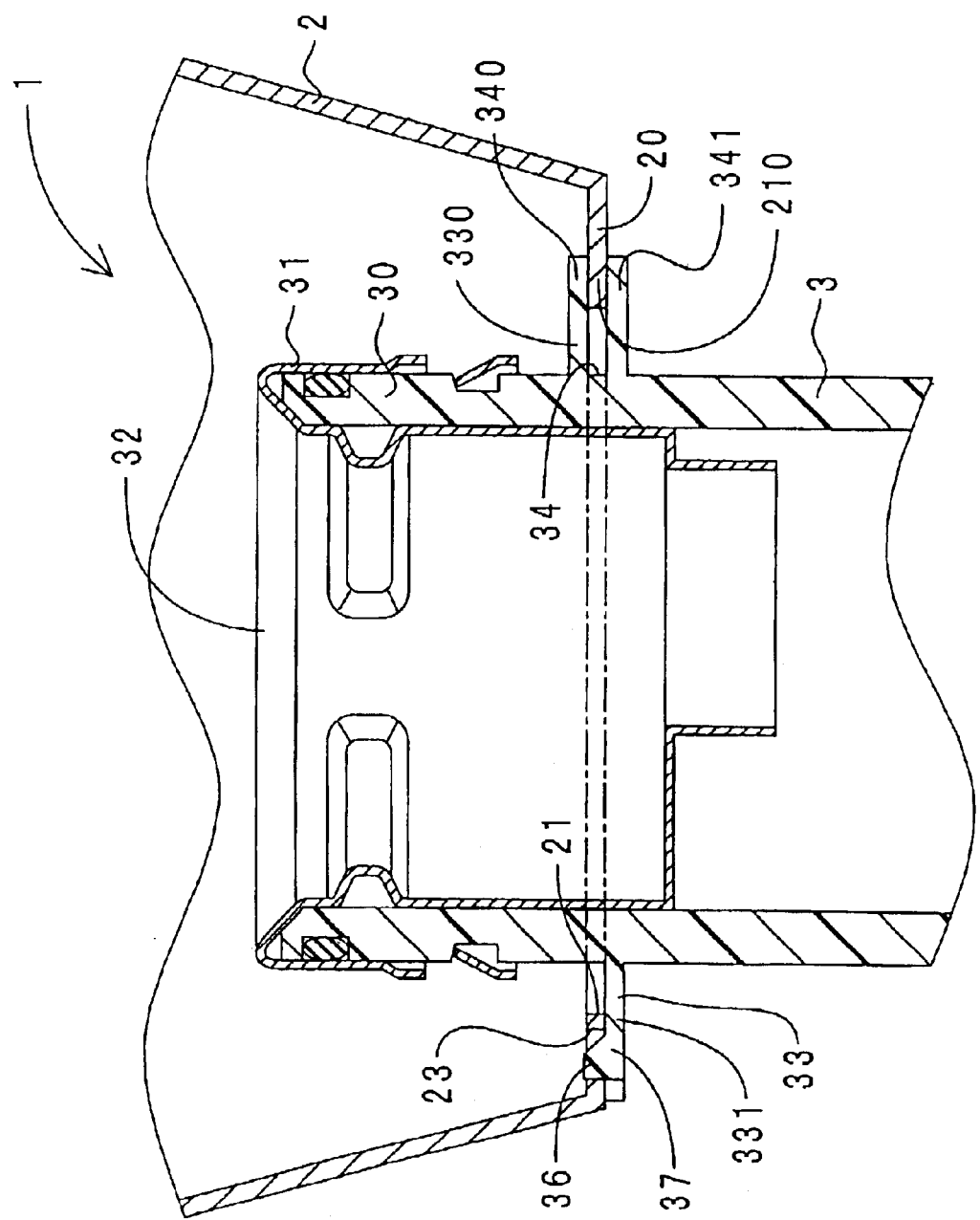
FIG. 10 is an axial cross-sectional view of a fuel supply apparatus according to Example No. 3 of the present invention.

FIG. 10 illustrates an axial cross-sectional view of a fuel supply apparatus 1 according to Example No. 3 of the present invention. Note that component parts like those in FIG. 6 are designated with identical numerals. As illustrated with alternate long-and-dash lines, the bottom wall 20 is formed as a flat shape, or the left-hand side of the bottom wall 20 is flush with the right-hand side in the drawing. Because of the arrangement, the second arc 331 is formed at a lower position than it is formed in Example No. 2. Note that the assembly operation is carried out in the same manner as Example No. 2.

In the fuel supply apparatus 1 according to Example No. 3, it is not necessary to form the bottom wall 20 as a step shape. Accordingly, it is possible to manufacture the fuel supply apparatus 1 according to Example No. 3 at furthermore reduced costs. Moreover, it is possible to upgrade the appearance of the inlet box 2.

Example No. 4

The difference between Example No. 4 and Example No. 2 is that the first arc is formed as a flat shape. Moreover, in association with the arrangement, a box-side engagement groove is formed at the periphery of the neck-penetrating opening, and is another feature. Therefore, only the distinctive arrangements will be hereinafter described.

Figure 11:
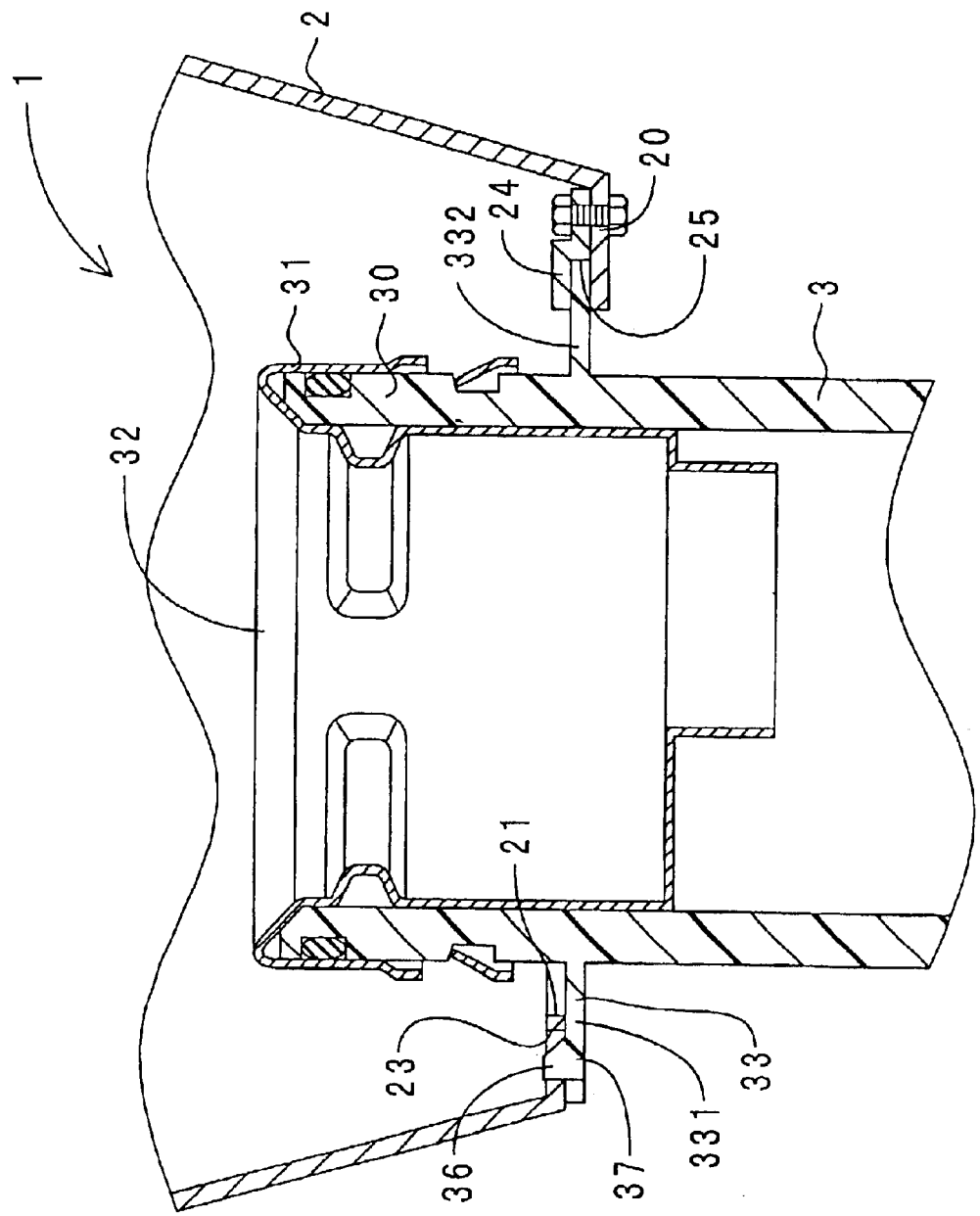
FIG. 11 is an axial cross-sectional view of a fuel supply apparatus according to Example No. 4 of the present invention.

FIG. 11 illustrates an axial cross-sectional view of a fuel supply apparatus 1 according to Example No. 4 of the present invention. Note that component parts like those in FIG. 6 are designated with identical numerals. As shown in the drawing, a first arc 332 is formed as a flat plate shape. Note that the first arc 332 is included in the flange-side axial engagement portion according to the present invention. Moreover, on the bottom wall 20, a metallic arc-shaped holder 24 is screwed to face the first arc 332. Moreover, a box-side engagement groove 25 is formed between the bottom wall 20 and holder 24. Note that the box-side engagement groove 25 is included in the box-side axial engagement portion according to the present invention. The first arc 332 is fitted into and held in the box-side engagement groove 25. The assembly operation is carried out in the same manner as Example No. 2.

In the fuel supplying apparatus 1 according to Example No. 4, it is possible to regulate the axial movements of the filler neck 3 by engaging the first arc 332 with the box-side engagement groove 25. Moreover, in the fuel supply apparatus 1 according to Example No. 4, the structure of the flange 33 is simplified.

Example No. 5

The difference between Example No. 5 and Example No. 2 is that a disengagement groove is formed in the groove wall. Therefore, only the distinctive arrangement will be hereinafter described.

Figure 12:
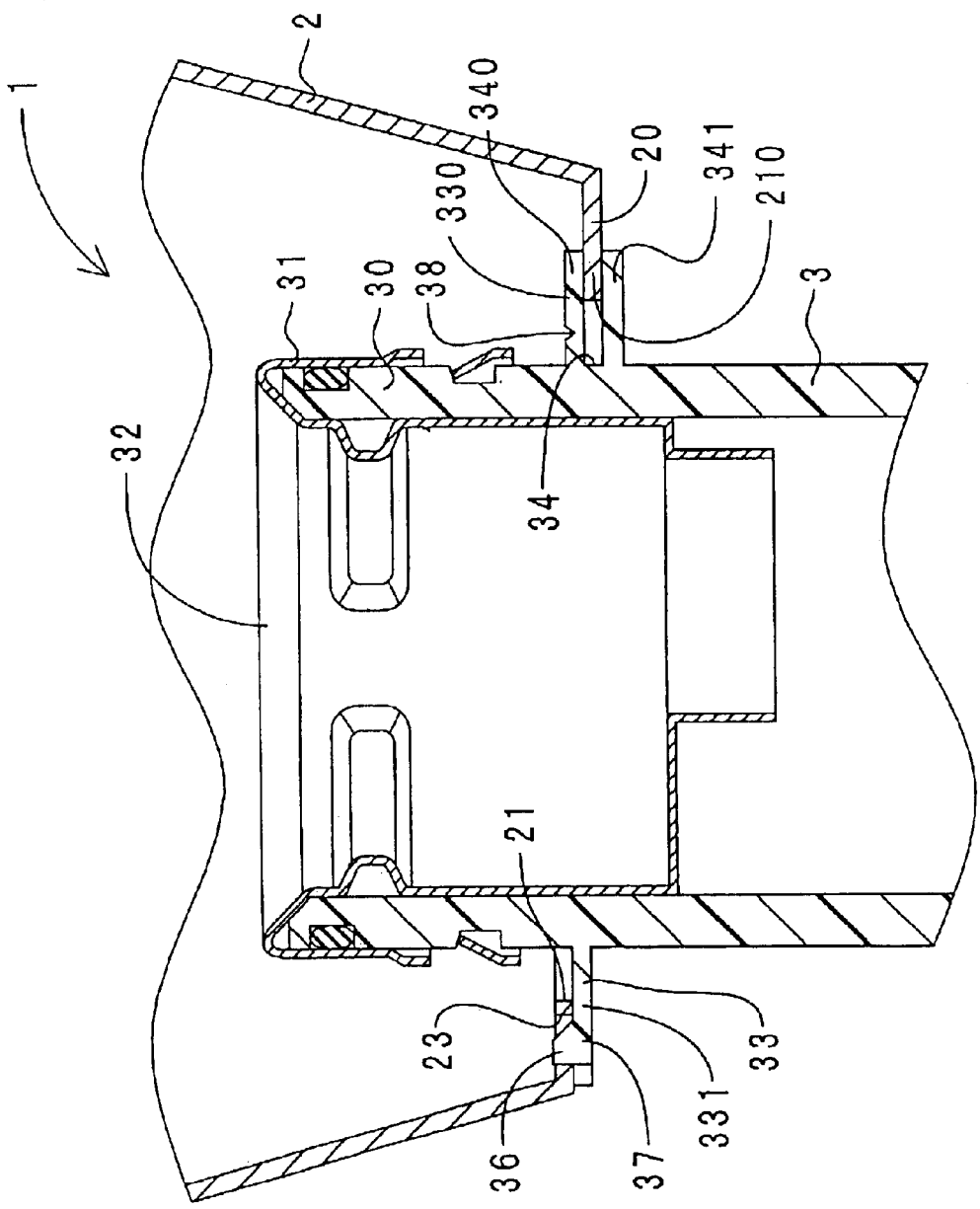
FIG. 12 is an axial cross-sectional view of a fuel supply apparatus according to Example No. 5 of the present invention.

FIG. 12 illustrates an axial cross-sectional view of a fuel supply apparatus 1 according to Example No. 5 of the present invention. Note that component parts like those in FIG. 6 are designated with identical numerals. As shown in the drawing, in the surface of the groove wall 340, a disengagement groove 38 is formed which has a letter "V"-shaped cross-section. The disengagement groove 38 extends like an arc parallel to the periphery of the groove wall 340.

Figure 13:
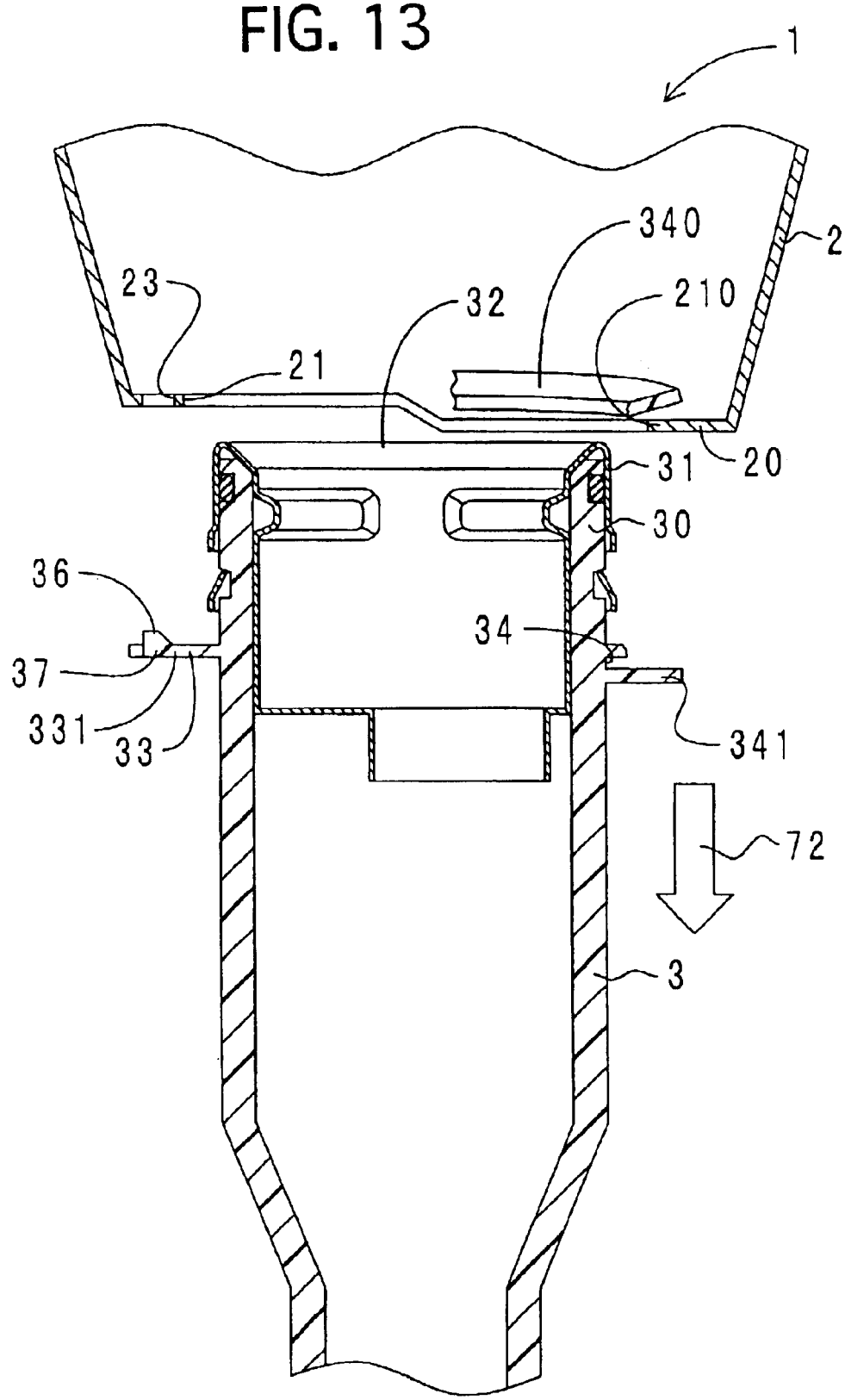
FIG. 13 is an axial cross-sectional view of the fuel supply apparatus according to Example No. 5 when a shock is applied to a vehicle.

FIG. 13 illustrates an axial cross-sectional view of the fuel supply apparatus 1 according to Example No. 5 when a shock is applied to a vehicle. Note that component parts like those in FIG. 6 are designated with identical numerals. When shocks whose magnitude is a predetermined stress or more are applied to the fuel supply apparatus 1 according to Example No. 5, the groove wall 340 fractures starting at the bottom of the disengagement groove 38. When the groove wall 340 fractures, the engagement between the periphery 210 and engagement groove 34 disengages. Accordingly, as designated with the arrow 72, the filler neck 3 falls down into the vehicle while leaving only the fractured groove wall 340 in the inlet box 2. Thus, the fuel supply apparatus 1 according to Example No. 5 is less likely to bring about a certain disadvantage to inlet pipes and fuel tanks.

Example No. 6

The difference between Example No. 6 and Example No. 1 is that the filler neck is formed of conductive resin. Specifically, the filler neck is formed of resin with conductive carbon added. Therefore, only the distinctive arrangement will be hereinafter described.

Figure 14:
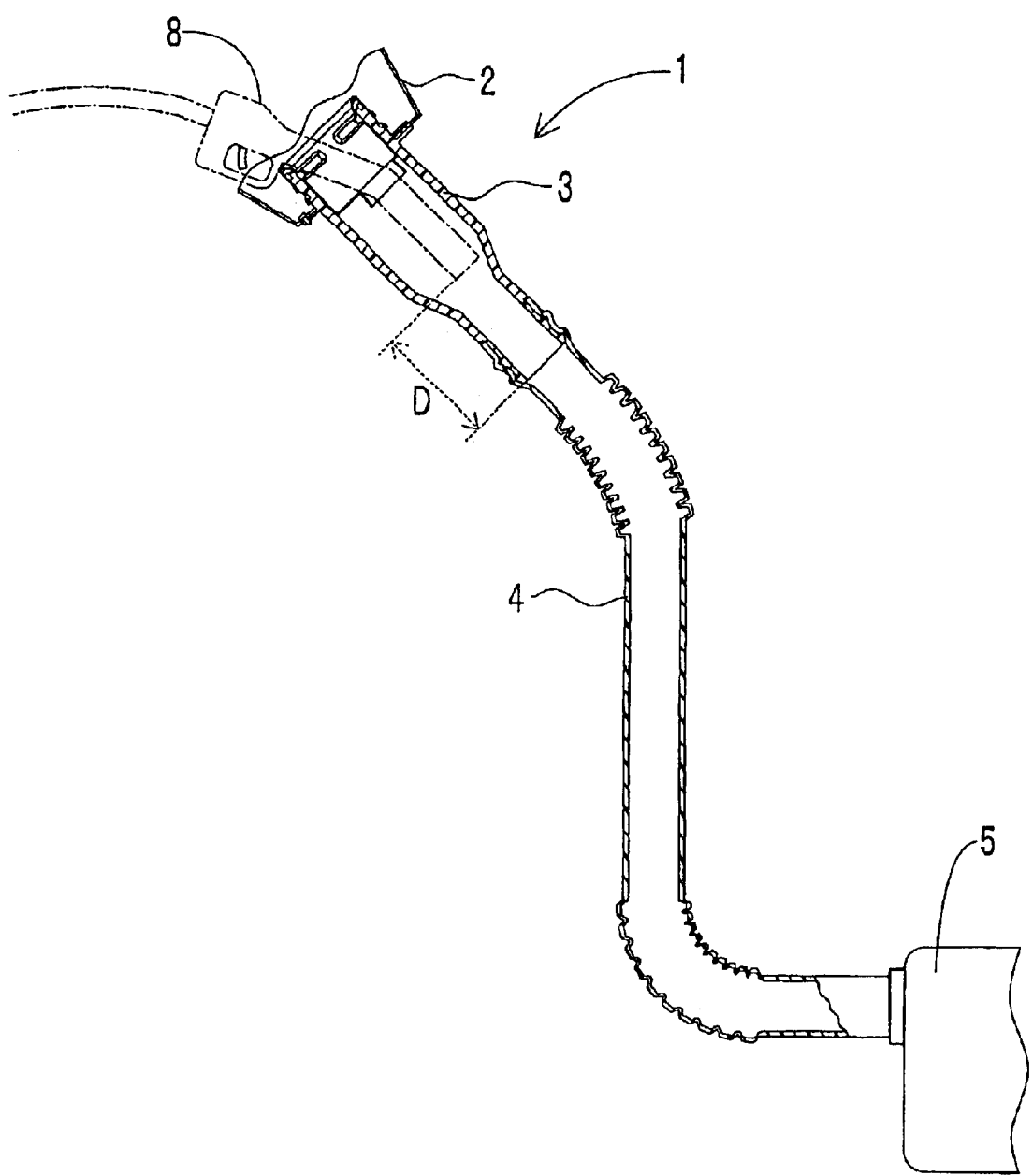
FIG. 14 is a drawing for illustrating how a fuel supply apparatus according Example No. 6 of the present invention is disposed.

FIG. 14 illustrates how a fuel supply apparatus 1 according to Example No. 6 of the present invention is disposed. Note that component parts like those in FIG. 1 are designated with identical numerals. In the fuel supply apparatus 1 according to Example No. 6, the filler neck 3 is connected with the inlet box 2 by the engagement between the engagement groove 34 and periphery 210, and by the clip 6 fitted into the flange-side engagement hole 35 and box-side engagement hole 22, as illustrated in aforementioned FIG. 2.

Moreover, the inlet box 2 is connected to the vehicle panel. Therefore, when the filler neck 2 carries a charge, it is possible to emit the charge to the vehicle panel in the following orders: the engagement groove 34, the periphery 210 and the inlet box 2; and the flange-side engagement hole 35, the clip 6, the box-side engagement hole 22 and the inlet box 2. Accordingly, when a fuel supply gun 8 is fitted into the filler neck 3, it is unlikely that discharge might occur between the filler neck 3 and fuel supply gun 8.

Note that the inlet tube 4 is made from PE and is non-conductive. Therefore, the inlet tube 4 might be charged by fuels flowing in the fuel supply. However, in the fuel supply apparatus 1 according to Example No. 6, a distance "D" is provided between the leading end of the fuel supply gun 8 and the top end of the inlet tube 4 (or the portion of the inlet tube 4 at which the inner peripheral surface of the inlet tube 4 is exposed) when the fuel supply gun 8 is fully fitted into the filler neck 3. Accordingly, the leading end of the fuel supply gun 8 are separated from the top end of the inlet tube 4 comparatively. Consequently, it is unlikely that discharge might occur between the fuel supply gun 8 and inlet tube 4.

In the fuel supply apparatus 1 according to Example No. 6, note that the volumetric resistivity of the filler neck 3 can preferably be $10^{11}$ $\Omega \cdot m$ or less, further preferably from $10^5$ to $10^8$ $\Omega \cdot m$. Thus, the filler neck 3 is more unlikely to be charged. Moreover, the distance "D" between the leading end of the fuel supply gun 8 and the top end of the inlet tube 4 can preferably be 10 mm or more. Thus, it is more unlikely that discharge might occur between the leading end of the fuel supply gun 8 and the top end of the inlet tube 4.

Example No. 7

The difference between Example No. 7 and Example No. 1 is that the first arc and second arc of the flange are disposed the oppositely with each other. Therefore, only the distinctive arrangement will be hereinafter described.

Figure 15:
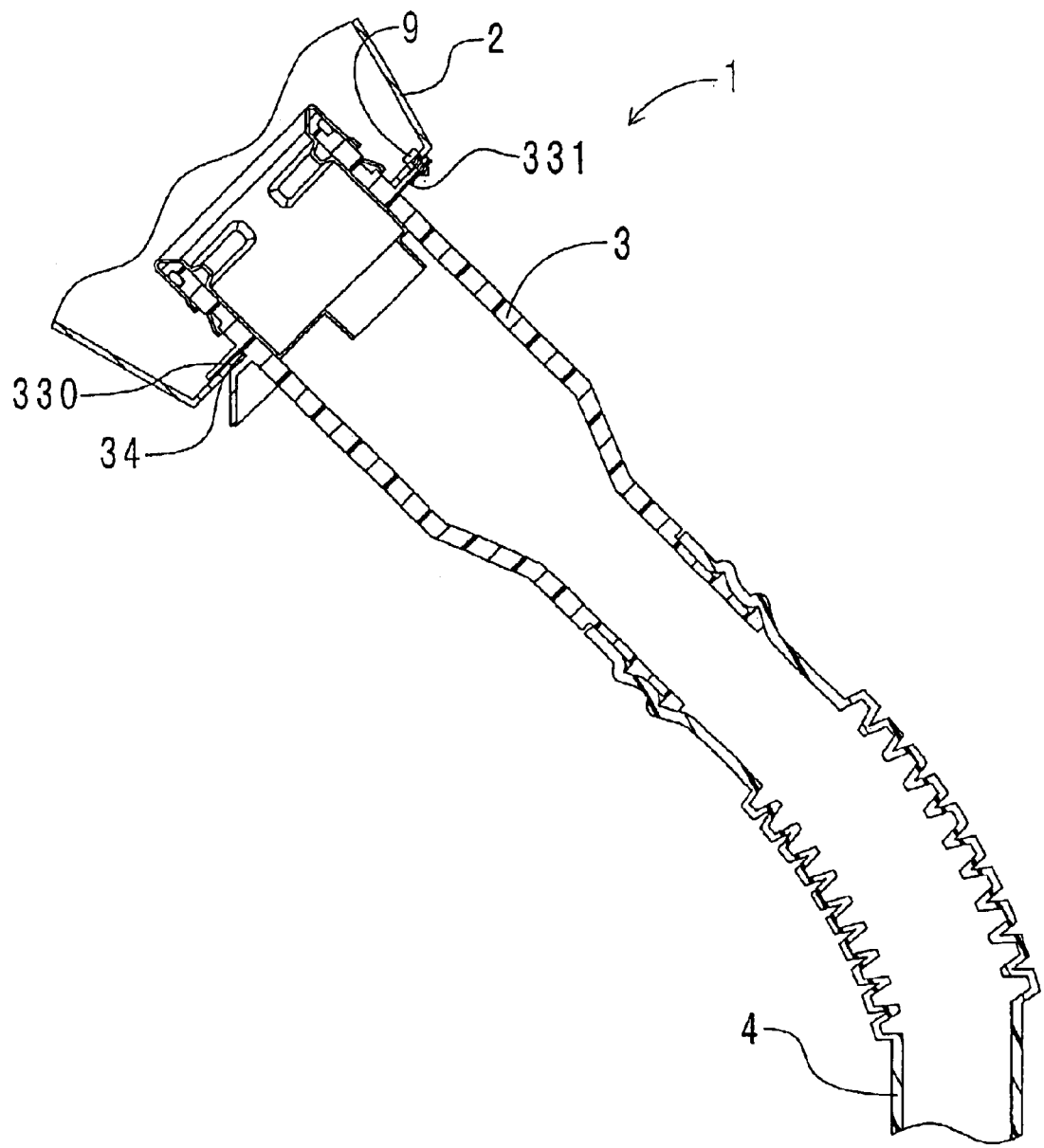
FIG. 15 is an enlarged drawing for illustrating how a fuel supply apparatus according to Example No. 7 of the present invention is disposed.

FIG. 15 is an enlarged drawing for illustrating how a fuel supply apparatus 1 according to Example No. 7 of the present invention is disposed. Note that component parts like those in FIG. 1 are designated with identical numerals. As can be seen from the drawing, when the fuel supply apparatus 1 is installed to a vehicle, the first arc 330 is disposed below the second arc 331 in the vertical direction of the vehicle.

Figure 16:
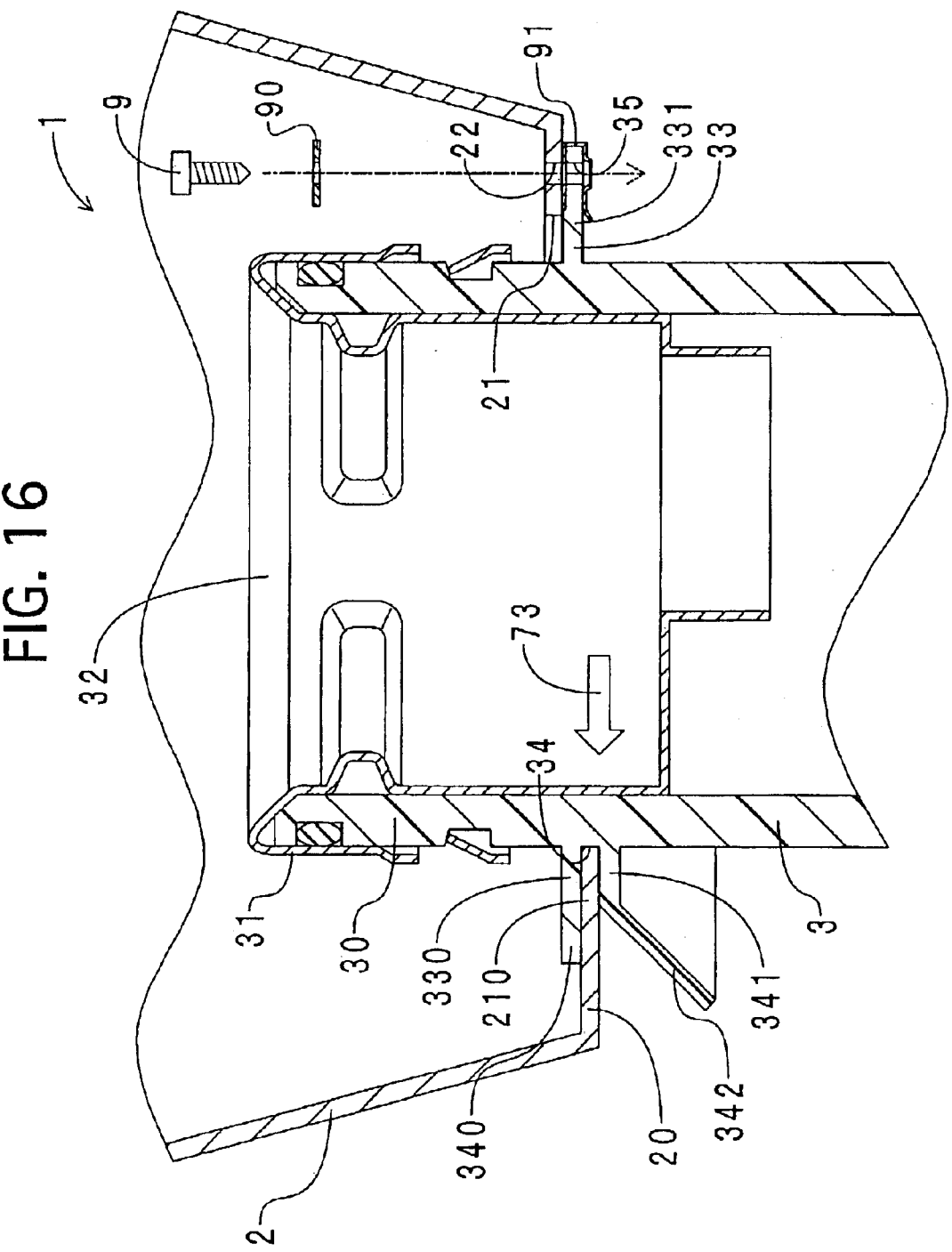
FIG. 16 is an axial cross-sectional view of the fuel supply apparatus according to Example No. 7 when it is assembled.
Figure 17:
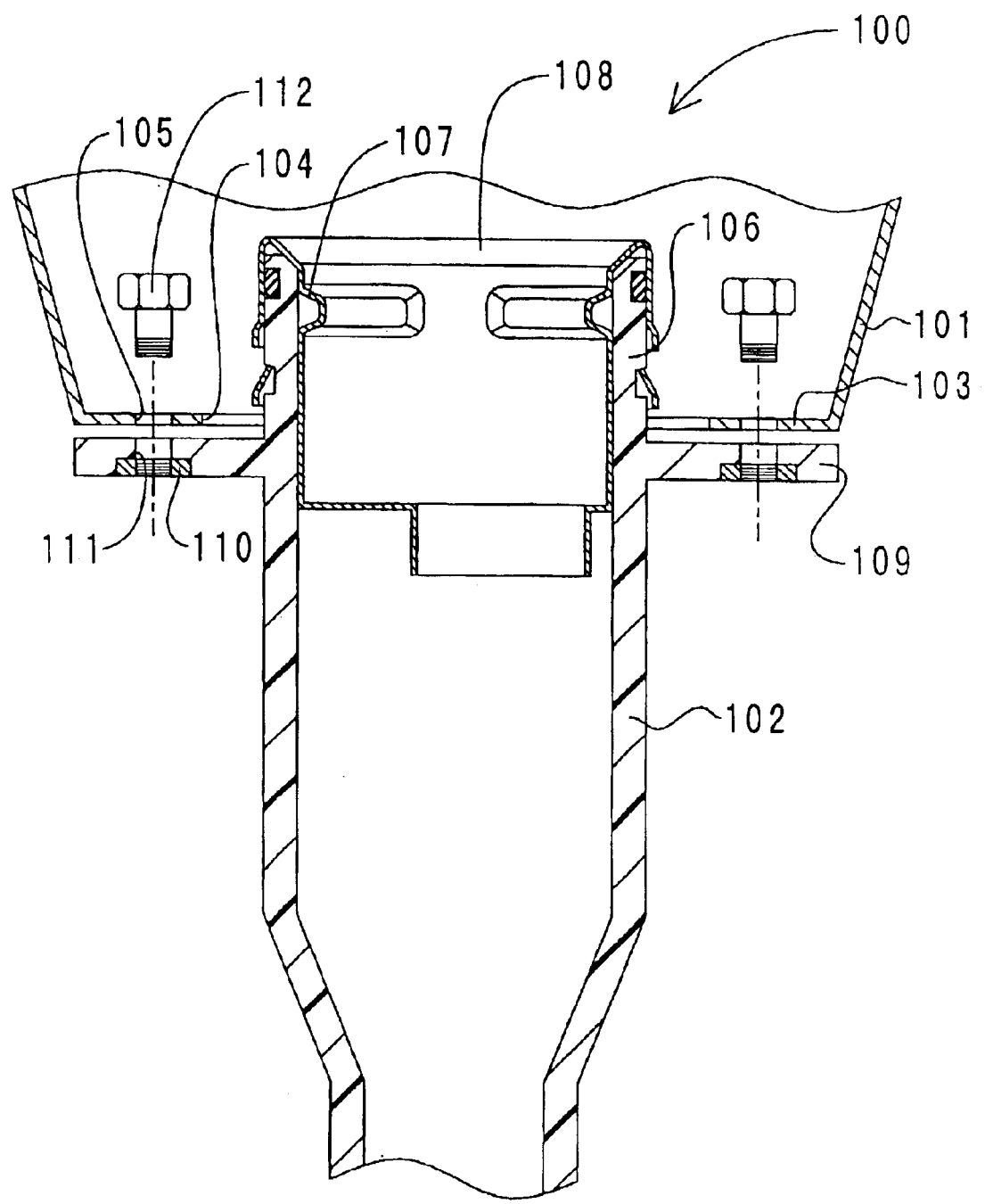
FIG. 17 is an axial cross-sectional view of a conventional fuel supply apparatus.

FIG. 16 illustrates an axial cross-sectional view of the fuel supply apparatus 1 according to Example No. 7 when it is assembled. Note that component parts like those in FIG. 4 are designated with identical numerals. As illustrated in the drawing, on the outer periphery of the groove wall 341, a guide 342 is formed. As described above, the engagement groove 34 is disposed over a distance of ⅓ of the peripheral length of the flange 33. Therefore, the guide 342 is also disposed over a distance of ⅓ of the peripheral length of the flange 33. Moreover, around the flange-side engagement hole 35 of the second arc 331, a fitting 91 having a letter "C"-shaped cross-section is disposed. A tapping screw 9 is fitted into a washer 90, the box-side engagement hole 22 and the flange-side engagement hole 35, and is screwed into the fitting 91 through the top wall and bottom wall of the fitting 91.

The filler neck 3 is assembled with the inlet box 2 in the following manner. First, from the inner side of the vehicle panel, the filler neck 3 is brought closer to the inlet box 2 to protrude the upper end 30 into the inlet box 2 through the neck-penetrating opening 21. In this instance, when the filler neck 3 is moved while moving the guide 342 along the neck-penetrating opening 21, it is likely to lead the upper end 30 through the neck-penetrating opening 21. Subsequently, the second arc 331 of the flange 33 is brought into contact with the bottom wall 20 of the inlet box 2. Then, the filler neck 3 is slid in the direction of the arrow 73. When the filler neck 3 is thus slid, the periphery 210 is fitted relatively into the engagement groove 34 between the groove wall 340 and groove wall 341. The filler neck 3 is slid until the box-side engagement hole 22, the flange-side engagement hole 35 and the two holes of the fitting 91 are lined up in series in the axial direction. Finally, the tapping screw 9 is screwed into the holes lined up in series by way of the washer 90.

When the fuel supply apparatus 1 according to Example No. 7 is assembled, it is possible to move the filler neck 3 while moving the guide 342 along the neck-penetrating opening 21. Accordingly, it is likely to lead the upper end 30 through the neck-penetrating opening 21.

Moreover, when the fuel supply apparatus 1 according to Example No. 7 is assembled, it is possible to temporarily fasten the filler neck 3 to the inlet box 2 by fitting the periphery 210 relatively into the engagement groove 34. Specifically, the engagement groove 34 is disposed below in the vertical direction of the vehicle as illustrated in FIG. 15, and is simultaneously disposed over a distance of ⅓ of the peripheral length of the flange 33. Accordingly, when the periphery 210 of the neck-penetrating opening 21 is fitted into the engagement groove 34, the periphery 210 is held between the groove wall 340 and groove wall 341. Therefore, even if an operator fails to hold the thus temporarily assembled fuel supply apparatus 1, the filler neck 3 is inhibited from falling down. Consequently, in accordance with the fuel supply apparatus 1 according to Example No. 7, it is not necessary for an operator to keep the flange 33 of the filler neck 3 pressing onto the bottom wall 20 of the inlet box 2 when screwing the tapping screw 9 into the box-side engagement hole 22, the flange-side engagement hole 35 and the fitting 91.

Modified Versions

The present fuel supply apparatus has been described so far with reference to specific examples. However, the manner of embodying the present fuel supply apparatus is not limited to the above-described examples. It is possible to achieve the present fuel supply apparatus in a variety of modified or improved modes which a person having ordinary skill in the art can carry out. For example, the inlet box 2 cannot necessarily be made of metal, but can be made from conductive resin. Further, the shapes and disposition quantities of the flange-side axial engagement portion, flange-side radial engagement portion, box-side axial engagement portion and box-side radial engagement portion are not limited in particular. Furthermore, the flange 33 cannot necessarily be divided into the first arc 330 (or 332) and the second arc 331. Specifically, the flange 33 can be an integral component part.

Moreover, the filler neck 3 cannot necessarily be made from PE. For instance, the filler neck 3 can be made from fuel-resistant resin such as polyamide resin (PA), polyoxymethylene resin (POM) and polyphenylene sulfide resin (PPS).

Having now fully described the present invention, it will be apparent to one of ordinary skill in the art that many changes and modifications can be made thereto without departing from the spirit or scope of the present invention as set forth herein including the appended claims.

What is claimed is:

1. A fuel supply apparatus, comprising:
   an inlet box dented in a vehicle panel, and having a bottom wall, a neck-penetrating opening pierced through the bottom wall, a box-side axial engagement portion and a box-side radial engagement portion; and
   a filler neck disposed to penetrate through the neck-penetrating opening into the inlet box, and having an outer peripheral surface provided with a flange, the flange having a flange-side axial engagement portion engaging with the box-side axial engagement portion to regulate axial movements of the filler neck and a flange-side radial engagement portion engaging with the box-side radial engagement portion to regulate radial movements of the filler neck; the flange-side axial engagement portion being an engagement groove dented radially at a periphery of the flange, the box-side axial engagement portion being an engagement tab fitted into the engagement groove and held therein, and the box-side axial engagement portion engaging with the box-side axial flange-side axial engagement portion when the flange-side axial engagement portion is slid toward the box-side axial engagement portion in the radial direction.

2. The fuel supply apparatus set forth in claim 1, wherein the flange-side axial engagement portion is disposed at a periphery of the flange over a distance of ⅓ or more of the peripheral length of the flange.

3. The fuel supply apparatus set forth in claim 1, wherein a disengagement groove is formed in a groove wall of the engagement groove, the disengagement groove disengaging the engagement between the engagement groove and the engagement tab when a predetermined stress is applied to said filler neck.

4. The fuel supply apparatus set forth in claim 1, wherein the flange-side radial engagement portion is a flange-side engagement hole penetrating top and bottom surfaces of the flange;
   the box-side radial engagement portion is a box-side engagement hole penetrating top and bottom surfaces of the bottom wall of said inlet box; and
   the fuel supply apparatus further comprises a clip penetrating the flange-side engagement hole and the box-side engagement hole.

5. The fuel supply apparatus set forth in claim 1, wherein the flange-side radial engagement portion is an engagement claw disposed to protrude from a top surface of the flange; and
   the box-side radial engagement portion is an engagement dent dented in a bottom surface of the bottom wall, the bottom surface facing the top surface of the flange, and engaging with the engagement claw.

6. The fuel supply apparatus set forth in claim 1, wherein the flange-side axial engagement portion and the flange-side radial engagement portion are disposed at diagonal positions to each other.

7. The fuel supply apparatus set forth in claim 1, wherein the flange-side axial engagement portion engages with the box-side axial engagement portion, thereby inhibiting the filler neck from swinging.

8. The fuel supply apparatus set forth in claim 1, wherein the flange comprises a first flange having the flange-side axial engagement portion, and a second flange having the flange-side radial engagement portion.

9. The fuel supply apparatus set forth in claim 1, wherein the filler neck is made from conductive resin, and is grounded to the vehicle panel by way of at least one member selected from the group consisting of the flange-side axial engagement portion and the flange-side radial engagement portion.

10. The fuel supply apparatus set forth in claim 4, wherein a peripheral middle of the engagement groove and the flange-side engagement hole are separated at an interval of 180 degrees in the peripheral direction.

11. The fuel supply apparatus set forth in claim 4, wherein the clip is not helically rotatable.

12. The fuel supply apparatus set forth in claim 1, wherein the flange-side axial engagement portion and the flange-side radial engagement portion are disposed at an interval of 180 degrees in a peripheral direction of the flange and the neck-penetrating opening.

13. The fuel supply apparatus set forth in claim 1, wherein the engagement tab has a diametrically-enlarged leading end.

14. The fuel supply apparatus as set forth in claim 1, wherein the filler neck is formed of conductive resin.

15. The fuel supply apparatus as set forth in claim 1, wherein the filler neck is formed of polyethylene resin.

* * * * *